United States Patent
Guzik et al.

(10) Patent No.: US 9,443,542 B1
(45) Date of Patent: Sep. 13, 2016

(54) HEAD GIMBAL ASSEMBLY (HGA) MOUNTING APPARATUS FOR A MAGNETIC HEAD AND DISK TESTER

(71) Applicant: Guzik Technical Enterprises, Mountain View, CA (US)

(72) Inventors: Nahum Guzik, Palo Alto, CA (US); Wei Zhuang, San Francisco, CA (US); Konstantin Perevoztchikov, Saratoga, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 15/080,726

(22) Filed: Mar. 25, 2016

Related U.S. Application Data

(60) Provisional application No. 62/138,114, filed on Mar. 25, 2015.

(51) Int. Cl.
*G11B 5/455* (2006.01)
*G11B 5/48* (2006.01)

(52) U.S. Cl.
CPC ............ *G11B 5/455* (2013.01); *G11B 5/4826* (2013.01)

(58) Field of Classification Search
CPC ........... B25B 1/00; B25B 5/00; B25B 5/061; B25B 1/2421; B25B 27/026; B23P 19/025
See application file for complete search history.

(56) References Cited

U.S. PATENT DOCUMENTS

| | | | |
|---|---|---|---|
| 6,748,841 B1 * | 6/2004 | Fritz ....................... | B25B 5/087 269/20 |
| 7,182,326 B2 * | 2/2007 | McIntosh ................ | B25B 5/062 269/24 |
| 7,516,948 B2 * | 4/2009 | McIntosh ................ | B25B 5/062 269/27 |
| 7,529,635 B2 | 5/2009 | Anderson et al. | |
| 7,542,868 B2 | 6/2009 | Anderson et al. | |
| 8,132,799 B2 * | 3/2012 | McIntosh ................ | B25B 5/062 269/27 |
| 8,376,336 B2 * | 2/2013 | McIntosh ............. | B23Q 16/001 269/24 |
| 2004/0070130 A1 * | 4/2004 | Pavlik ...................... | B23Q 3/18 269/32 |
| 2008/0062564 A1 | 3/2008 | Warn | |

OTHER PUBLICATIONS

Guzik Product Bulletin: Guzik V2002 Spinstand with XY-Positioning for Head, Headstack and Disk Testing, Guzik Part No. 02-107178-07, Rev. Sep. 17, 2007.

* cited by examiner

*Primary Examiner* — Lee D Wilson
(74) *Attorney, Agent, or Firm* — Burns & Levinson LLP; Joseph M. Maraia

(57) ABSTRACT

An apparatus for securing an HGA to a tester includes a housing with a cylindrical cavity disposed about an axis, and having, at its top end, a mounting surface with a central aperture, for receiving an HGA base plate with a boss hole of the HGA overlying the central aperture. Axially elongated clamp fingers, radially dispersed about a spreader pin, move along the axis between (i) a loading position with upper ends extending through and relatively far beyond the central aperture, and (ii) a clamping position with the upper ends disposed at or near the mounting surface. With an HGA on the mounting surface, and the clamp fingers at their loading position, the clamp fingers are driven downward, while simultaneously, the clamp fingers are driven outward by the spreader pin, and the clamp fingers engage boss hole edges, securing the HGA to the tester.

8 Claims, 8 Drawing Sheets

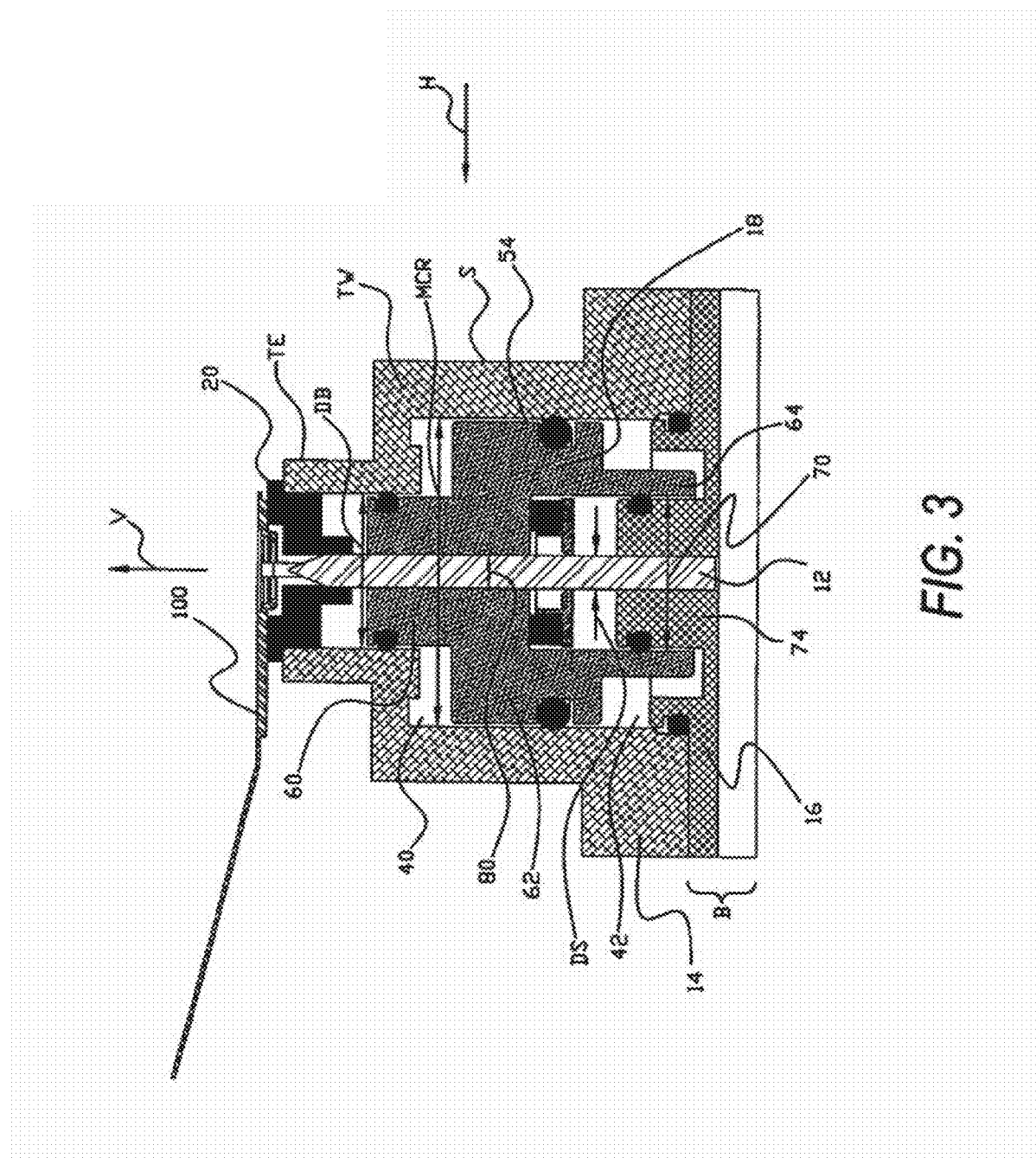

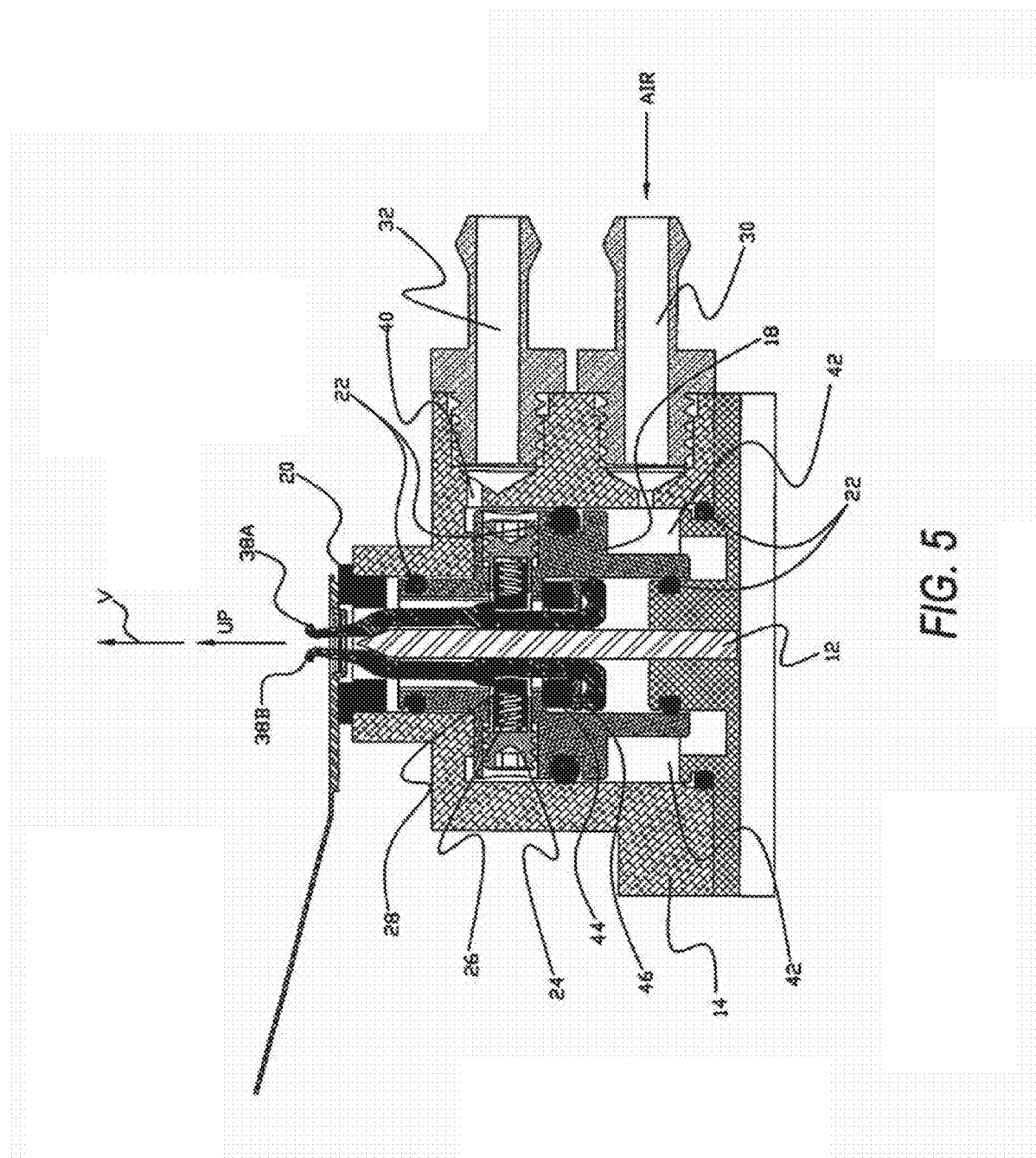

US 9,443,542 B1

HEAD GIMBAL ASSEMBLY (HGA) MOUNTING APPARATUS FOR A MAGNETIC HEAD AND DISK TESTER

REFERENCE TO RELATED APPLICATION

This application claims priority to U.S. Provisional Patent Application Ser. No. 62/138,114, filed Mar. 25, 2015, incorporated by reference herein.

FIELD OF THE INVENTION

The present invention relates to magnetic head and disk testers, and in particular, to a device that mounts a read/write head on a head and disk tester.

BACKGROUND OF THE INVENTION

A magnetic head/disk tester is an instrument that is used for testing the characteristics of magnetic read/write heads and disks for various performance parameters, such as a signal-to-noise ratio, track profile, etc. A magnetic head/disk tester is operable to simulate motions of a head with respect to a disk that occur in an actual hard disk drive during operation. A tester comprises a mechanical component, commonly referred to as a spinstand, that performs movements of the head with respect to the disk, and an electronic component that is responsible for measurement, calculation, and analysis, of signals measured in response to applied test signals.

Examples of prior art spinstands for a head and disk tester, include the Guzik V2002 X-Y Positioning Spinstand and the Guzik 5-1701B Micro-Positioning Spinstand, both of which are available from the assignee of the present disclosure, Guzik Technical Enterprises, 2443 Wyandotte Street, Mountain View, Calif. 94043, USA (www.guzik.com).

When testing a head, or a disk, with a spinstand, it is usual practice to perform the testing with a magnetic read/write head included as a part of a head gimbal assembly (HGA). An example of a conventional HGA 100 is shown in FIG. 1. The basic components of HGA 100 are a head 102, a load beam 104, a flat-bottomed base plate 108 having a boss hole 110 with an angled (with respect to the bottom of base plate 108) peripheral surface 110a, a flex circuit 112, flex circuit (connector) pads 118, and shunt tab 114. The angled surface 110a of the boss hole 110 is used for clamping the HGA 100 to a mounting surface of the spinstand. The flex circuit 112 includes electrically conductive paths for coupling the head 102 by way of flex circuit (connector) pads 118 to external head test circuitry, including a head amplifier (not shown).

During testing, it is important that a head is positioned with great accuracy relative to a disk on a tester. It is also important that the positioning of successively tested heads is consistently repeatable. These requirements are generally met by incorporating in the tester, a clamping mechanism that couples a head gimbal assembly (HGA) and the spinstand, ensuring highly accurate positioning of the HGA.

In the prior art, the clamping mechanism of a spinstand is typically realized as a so-called "collet assembly", for example, as shown and described in U.S. Pat. No. 7,529,635, U.S. Pat. No. 7,542,868, US Patent Application Publication No. 2008/0062564, and others. A diagram of such a collet assembly 200 is shown in FIG. 2. The collet assembly 200 includes an integrated air piston disposed within a cylindrical interior region defined by housing 214 of the collet assembly 200. The cylindrical interior region extends along and about a vertical (as shown in FIG. 2) axis V.

The air piston comprises a piston top 208, a retainer 210 and an O-ring 206, all moveable together along the vertical axis during testing, inside the collet housing 214. A flat top surface of the housing 214, extending transverse to the vertical axis, is the mounting surface 224 against which the flat underside of base plate 108 of HGA 100 is placed for testing of the head of the HGA.

A set of four sealing O-rings 222 is also disposed within the housing 214 of collet assembly 200. An uppermost of O-rings 222 is disposed about an uppermost portion of the piston top 108, forming a sliding pneumatic seal between that portion and an inward facing surface of the cylindrical interior of housing 214. A next lower of O-rings 222 is disposed about a junction of piston top 208 and retainer 210. That next lower of O-rings 222 pneumatically isolates an upper region 220 of the cylindrical interior region above the top 208 of the air piston, from a lower region 218 below the retainer 210, while permitting vertical sliding motion of the air piston with respect to housing 214.

The collet assembly 200 further comprises a set of four elongated collet fingers 204 (two of which are shown in FIG. 2) extending in part in the direction of the vertical axis. The collet fingers 204 are angularly dispersed about the vertical axis in a uniform manner. The collet fingers 204 include inward facing (i) lower straight edge surfaces extending in the direction of elongation, (ii) cam surfaces extending therefrom (inward with respect to the vertical axis) at an offset angle, and (iii) upper straight edge surfaces extending in the direction of elongation. The collet fingers 204 further include outwardly, radially extending clamp ends 204A at their distal (uppermost as shown in FIG. 2) ends. The distal ends of the collet fingers 204 (as shown in FIG. 2) extend through an aperture of piston top 208 with the air piston in its uppermost position along axis V.

The inner facing lower surfaces of the collet fingers 204 facing the vertical axis, are disposed about a cylindrical outer surface of a spreader pin 212 extending along the vertical axis from a spreader base 216. The spreader pin 212 has a conical surface at its uppermost end. The spreader pin 212 is stationary in the direction of axis V throughout operation, with its lowermost end attached to the spreader pin base 216 which is rigidly coupled to housing 214. The angled cam surfaces of fingers 204 are disposed adjacent to the conical end surface of pin 212, in the position of the piston shown in FIG. 2.

The lowermost two O-rings of the set 222 are disposed about spreader base 216, and respectively effect a pneumatically sealing junction between spreader pin base 216 and an inward facing surface of retainer 210, and between spreader base 216 and an inward facing surface of the cylindrical interior region of the housing 214.

The O-ring 206 fits around a lowermost portion, or base end, of the fingers 204 and provides a radially inward (with respect to the vertical axis) force to resiliently bias the fingers 204 radially inward.

Prior to mounting an HGA 100 for test, pressurized air is applied to region 218 via a port P1 (not shown), which drives piston top 208 upward along the vertical axis, to the position shown in FIG. 2. In that initial position, the inner facing lower surfaces of collet fingers 204 of collet assembly 200 are biased against the cylindrical outer surface of spreader pin 212 with the distal ends of fingers 204 extending maximally above mounting surface 224. Radially extending lips at the upper end of retainer 210 hold the fingers 204 in place relative to the piston top 208. In this position, as illustrated in FIG. 2, the distance spanning the clamp ends 204A at the distal ends of the fingers 204 is less than the diameter of the boss hole of an HGA 100 to be tested.

With collet assembly 200 in the initial position of FIG. 2, in order to mount an HGA 100 to surface 224 of collet assembly 200, HGA 100 is lowered with its boss hole 110a slipping over the distal ends of the extended fingers 204 so that the flat-bottomed base plate 108 rests on surface 224. In their maximally extended (in the direction of the vertical axis as shown in FIG. 2) initial position, the inward facing lower surfaces of fingers 204 are biased by O-ring 206 against the cylindrical outer surface of spread pin 212.

Then, in response to pressurized air (with pressure greater than the pressure in lower region 218) introduced to upper region 220 via a port P2 (not shown), the piston top and retainer 210, as well as fingers 204, are driven downward along the vertical axis. As the fingers 204 move downward, the inward angled cam surfaces of the fingers 204 engage the conical surface at the tip of spreader pin 212, causing an outward directed force on the fingers 204, overcoming the bias applied by O-ring 206 and spreading the distal ends of fingers 204 so that the distal ends of fingers 204 span a distance greater than the innermost diameter of the angled edge 110a of boss hole 110 in the base plate 108 of the HGA adjacent to surface 224, and through continued downward motion, the downward facing surfaces of the radially extending clamp ends of pins 204 ultimately engage surface 110a surrounding boss hole 110 of base plate 108 of HGA 100, thereby clamping HGA 100 to surface 224.

To release a clamped HGA 100, pressurized air (at a pressure greater than that in upper region 220) is introduced to lower region 218, causing upward movement of the piston top 208, retainer 210 and fingers 204, and the distal ends of the fingers return to the initial state with the distal ends of fingers 204 maximally separated from surface 224 in the direction of the vertical axis, and inwardly biased with the lower surfaces of fingers 204 again biased by O-ring 206 against the outer cylindrical surface of spreader pin 212, thereby releasing HGA 100.

While the above-described collet assemblies of the prior art, do allow testing of head and disks in some form, there is much room for improvement in many factors in order to meet developing demand for improved heads and reasonable prices for today's market.

For example, in order to optimize operation in one sense, a collet assembly for a head and disk tester should be lightweight to make possible fast movement of the HGA during positioning of the head over the disk. On the other hand, the housing must have a rigid mounting area to support the HGA, in order to be able to attain high accuracy testing for a unit, and enabling repeating of such tests over large numbers of production units. To partially address these requirements in prior art collet assemblies for head and disk testers, such as that shown in FIG. 2, the housings are typically made from titanium, which is lightweight as well as strong. However, titanium is a costly material that raises the cost of prior art collet assemblies for head and disk testers as a whole.

More importantly, in prior art collet assemblies such as that shown in FIG. 2, the clamping forces which the various collet fingers apply to the angled surface 110a of a boss hole 110 of an HGA, typically vary significantly from one finger to another. The difference in the clamping forces applied by the different fingers, leads to a skewing of the base plate 108 of the HGA 100 relative to the mounting surface 224. Such a skewing disrupts correct positioning of the HGA, affects the accuracy and the repeatability of tester measurements, and can cause damage to the disk.

Also, as seen in the typical prior art collet assembly of FIG. 2, the lower end of the spreader pin 212 is rigidly secured in the spreader base 216, while the upper end spreader pin 212 is not rigidly fastened to the housing, allowing the distal (or top as shown) end of the spreader pin 212 to be unrestrained with respect to movement in a radial direction. As a consequence, during movements of the air piston in such prior art collet assemblies, the unsecured end portion of the spreader pin bends during the movements of mounting an HGA. Such bending results in radially directed movement of the upper end of the spreader pin, causing unwanted displacement of an HGA base plate to occur during placement into its test position on the tester. A direct consequence of such a misplacement of an HGA, is test results which do not accurately reflect the true characteristics of the head of the HGA.

Moreover, with passage of time, the elasticity of the O-ring which effects inward bias to the fingers, tends to diminish, resulting in a corresponding reduction in the retracting force that keeps the fingers 204 together prior to their spreading for clamping an HGA. Thus, this diminishment of elasticity is one more factor leading to improper placement of an HGA for testing. As marketplace demands require higher and higher memory storage densities, there arise corresponding requirements for increased accuracy in positioning an HGA for testing in modern head and disk testers, for each head tested and for repeatability of such tests in large scale production.

The above-mentioned disadvantages of known so-called collet assemblies for head and disk testers raise the cost for testing, and in some cases prevent the needed accuracy and reliability of testers. The disclosure set forth below, provides improvements in the design and construction of prior art so-called collet assemblies (while referring to the improved assemblies as "mounting apparatuses") for head and disk testers. The mounting apparatuses of the disclosure substantially reduce, and in most cases fully eliminate, the above-noted deficiencies of prior art so-called collet assemblies of, or for, head and disk testers, while also reducing the cost compared to prior art collet assemblies, and testers for which they are a part, and at the same time, improving the performance, of such testers with the improved mounting apparatuses.

SUMMARY

According to the present disclosure, a head gimbal assembly (HGA) mounting apparatus for a magnetic head and disk tester provides an apparatus which in some respects is similar to a mounting apparatus (or so-called "collet assembly") of head and disk testers of the prior art, but includes specific improvements in structure which directly provide improved performance and cost of manufacture for such components of head and disk testers.

In a form having herein-called "clamp fingers" which generally correspond to the so-called "collet fingers" described above for the prior art assembly of FIG. 2, an improved finger/air piston structure prevents the skewing issue noted above for an HGA base plate clamped by the prior art "collet fingers" to a prior art so-called "collet assembly". More particularly, the clamp fingers of this disclosure include a multi-element washer assembly, including an elastic washer with an adjacent rigid washer, both disposed about a spreader pin and intervening between a bottom surface of the air piston and lowermost ends of the clamp fingers. The combination of the elastic washer and the rigid washer, result in equalization of clamping forces applied from finger to finger on the base plate of an HGA, so that the different clamp fingers apply forces of equal magnitude to the base plate, eliminating otherwise-possible HGA base plate skewing.

In another form having elements which generally correspond to the so-called "collet fingers" described above for the prior art assembly of FIG. 2, an improved compression structure, compared to the prior art O-ring structure, improves the structure providing an inward-directed compression/retraction force applied to inwardly bias the fingers in the initial state to keep them from spreading prior to being in position to clamp an HGA to the tester. In particular, a set of spring-based pressing devices is positioned for each finger, to apply radially inward-directed spring forces to the respective fingers with respect to the housing, biasing the fingers against a spreader pin. The replacement of the prior art O-ring for this purpose, by the set of pressing devices, removes from the mounting apparatus of this disclosure, component parts (namely, the O-rings utilized for this purpose) that quickly wear out with time and use. The novel spring-based pressing devices provide longer term retention of desired parameters for head and disk testers.

In another form having elements which generally correspond to the housing of the so-called "collet assembly" described above for the prior art assembly of FIG. 2, an improved housing of the mounting apparatus of the present disclosure comprises two parts: a housing base and an HGA supporting bushing. The housing base is manufactured from a lightweight inexpensive material such as aluminum, while the HGA supporting bushing is made from a hardened material such as hardened stainless steel. The improved multiple part structure meets the general rigidity and strength requirements for the housing, while providing a structure which is significantly lighter than corresponding prior art structures and is substantially without cost differential.

In particular, the HGA supporting bushing is a ring-like structure which extends along a central, and preferably vertical, axis and includes a central cylindrical void region, or core, extending along that axis with a diameter slightly greater than a spreader pin diameter. The upper end of the spreader pin extends within this central cylindrical void region of the HGA supporting bushing, so that the movement of upper end of the spreader pin end is radially restricted to eliminate radial-directed bending of the pin, as is encountered in corresponding prior art structures. With the improvement in structure provided by the HGA supporting bushing, yet another source of HGA positioning error is eliminated.

Additional improvements and their advantageous consequences are described in detail below.

BRIEF DESCRIPTION OF THE DRAWINGS

FIG. 3 shows a side sectional view of an exemplary mounting apparatus according to the present disclosure, providing improvements over the collet assembly of FIG. 2 and the like.

FIG. 5 shows the mounting apparatus of FIG. 4 at a stage of operation with the air piston of the mounting apparatus at its uppermost position along a central, and preferably vertical (as shown), axis.

DETAILED DESCRIPTION

Figure 1:
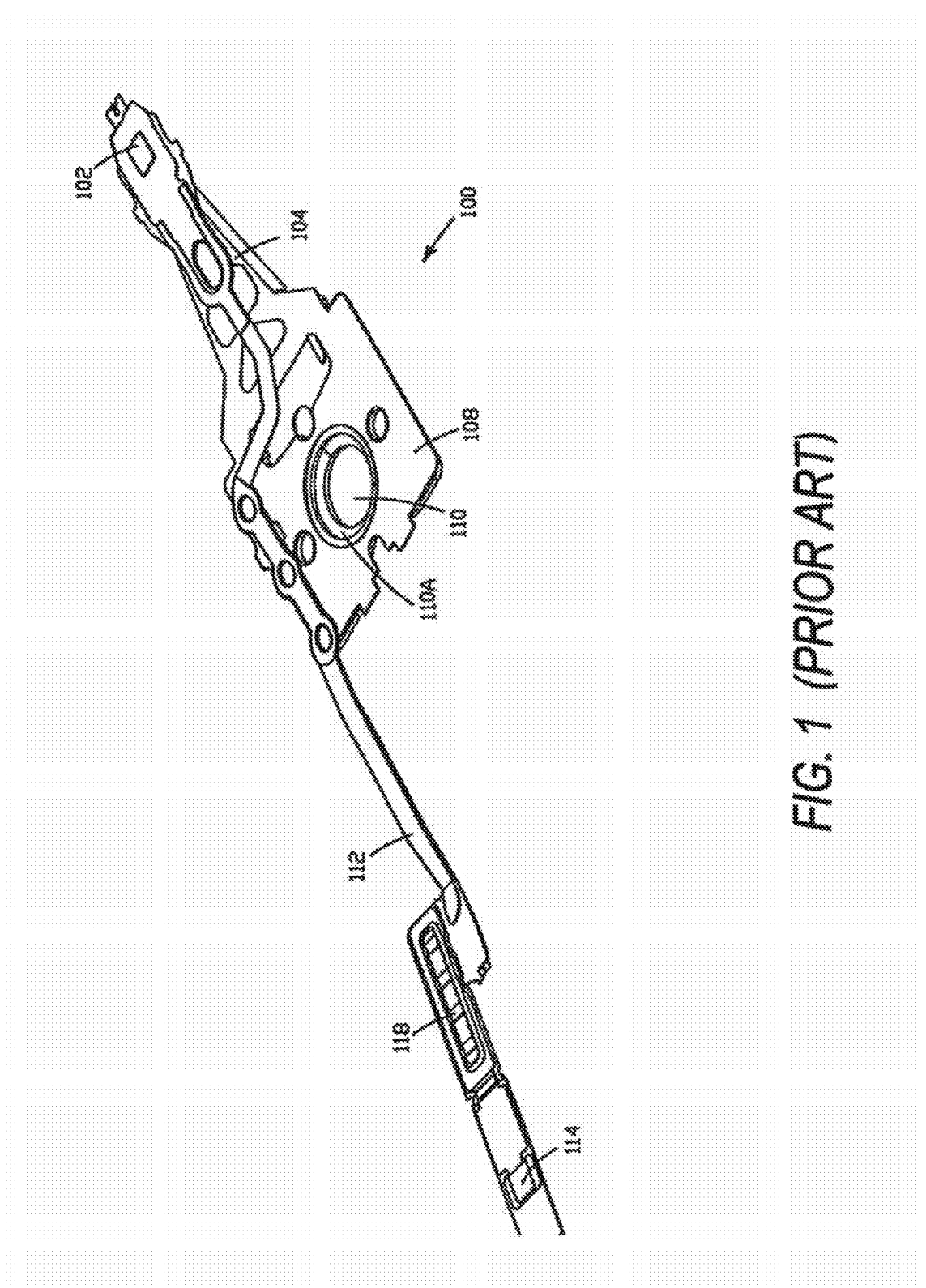
FIG. 1 shows a conventional head gimbal assembly (HGA).

An exemplary head gimbal assembly (HGA) mounting apparatus 10 for a magnetic head and disk tester of the present disclosure, together with an exemplary HGA 100, is shown in FIGS. 3-6.

In the cross-section view of FIG. 3, the plane of the cross section does not pass through any of three clamp fingers 38A, 38B and 38C of mounting apparatus 10, and as a result, no clamp fingers are visible in FIG. 3. In the cross-section view of FIGS. 5-6, the plane of the cross section does pass through two of three clamp fingers of mounting apparatus 10, and as a result, those two clamp fingers 38A and 38B are visible in FIGS. 5-6. All three clamp fingers 38A, 38B and 38C of mounting apparatus 10 are visible in the exploded view of mounting apparatus 10 of FIG. 4.

In the exemplary form of mounting apparatus 10 shown in FIGS. 3-6, mounting apparatus 10 includes a two-element housing H comprising a housing base 14 and a stepped HGA supporting bushing 20, both disposed along and about a central, and preferably vertical, axis V. That housing H corresponds, but only in a limited sense, to the single-element housing 214 of the prior art structure shown in FIG. 2.

In mounting apparatus 10, three clamp fingers 38A, 38B and 38C are disposed within housing H and are adapted to move in the direction of axis V, in response air pressure differentials applied across an air piston 18 acting as a carrier structure, carrying the clamp fingers. The clamp fingers 38A, 38B and 38C (elongated in the direction of the axis V) and their carrier structure, air piston 18, correspond, but only in a limited sense, to the clamp fingers 204 and their carrier structure, piston top 208 and retainer 210, of the prior art structure shown in FIG. 2.

Figure 2:
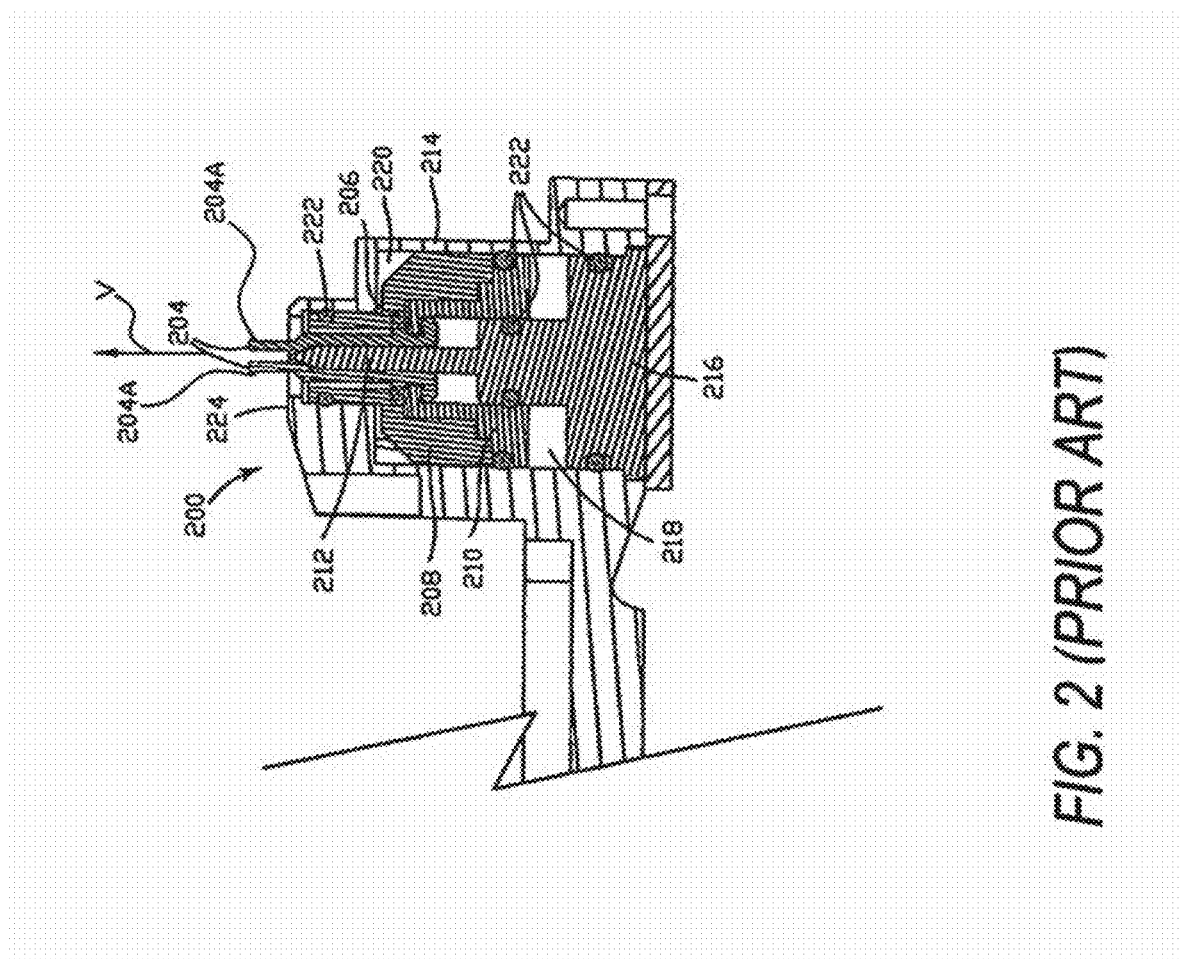
FIG. 2 shows a prior art so-called "collet assembly" for a magnetic head and disk tester.

Thus, while many of the components of the mounting apparatus 10 of the disclosure are similar, in both structure and function, in some respects to components of the prior art exemplified in FIG. 2, the differences provide significant improvements in performance and manufacturability of the mounting apparatus of the disclosure compared to the prior art.

Regarding certain of those differences, a desired characteristic of a housing of an HGA mounting apparatus, such as mounting apparatus 10, is that it be be lightweight to make possible a fast positioning of a head over a disk on a spinstand. On the other hand, the housing should have a rigid top surface for use as a mounting surface to support an HGA placed on the mounting apparatus 10 for testing. To meet those requirements, the housing of the mounting apparatus 10, according to the present disclosure, consists of two parts: a housing base 14 and an HGA supporting bushing 20.

The housing base 14 is preferably manufactured from a lightweight inexpensive material such as aluminum, while the HGA supporting bushing 20 is made from hardened material such as hardened stainless steel. In that way, the prior art use of such expensive material as titanium for the full housing of a mounting apparatus 10 is removed, and the rigidity and strength requirements for the housing are met without cost increase compared with corresponding elements of a prior art mounting apparatus, such as that shown in FIG. 2.

As noted above, and as shown in FIGS. 3-6, the housing H comprises a housing base 14 and an HGA supporting bushing 20 (shown in detail in FIG. 3A), both disposed along and about a central axis V. The housing base 14 includes a cylindrical shell top element TE disposed about the axis V and defining a cylindrical inner region disposed about the axis V and having an inner diameter DB. A top wall TW extends outward from a lower end of top element TE to a sidewall S extending downward to a base wall B extending transverse to the axis V, thereby determining an interior housing region including a medial cylindrical region 54 having an inner diameter MCR which is greater than DB. The sidewall S includes an upper port 32 pneumatically coupled to an upper portion 40 of medial cylindrical region 54, and a lower port 30, pneumatically coupled to a lower portion 42 of medial cylindrical region 54.

Figure 3A:
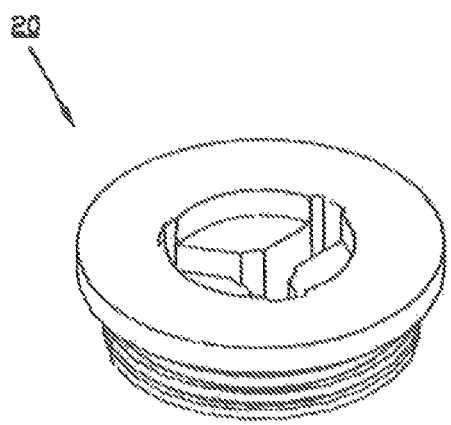
FIG. 3A shows a top perspective view of an HGA supporting bushing of the housing of the mounting apparatus of FIG. 3.

An exemplary HGA supporting bushing 20 is shown in FIG. 3A (top perspective view). The HGA supporting bushing 20 is a stepped cylindrical element extending along the axis V, and having an upper portion having an outer diameter greater than DB and a lower portion having an outer diameter less than DB and adapted to securely interfit with the top of cylindrical shell top element TE of housing base 14, for example, by way of complimentary threaded portions. The HGA supporting bushing 20 is preferably a hardened metal structure, for example, made of stainless steel, providing a hard, flat upper surface 20A (with a central bore along axis V with a diameter 80) for receiving the base plate of an HGA to be clamped to the tester. As described below, the central bore includes radial outward extending slots, each for guiding radial and axial (along axis V) movement of a respective one of clamp pins 38A, 38B and 38C therethrough.

A stepped cylindrical carrier 18 is disposed within the interior region of the housing and extends along and about the axis V. Carrier 18 includes an upper cylindrical shell portion 60 having an outer diameter slightly less than DB, a central cylindrical shell portion 62 having an outer diameter slightly less than the inner diameter MCR of medial cylindrical region 54, and a lower cylindrical shell portion 64 having an outer diameter less than inner diameter MCR, and an inner diameter 70.

The base wall B includes a cylindrical spreader pin support element 74 having an outer diameter less than diameter 70, and disposed about and extending upward along axis V from the portion of base wall B extending transverse to axis V.

A cylindrical central bore having diameter 80, extends along the axis V through upper cylindrical shell portion 60 and central cylindrical shell portion 62 of carrier 18 and as well as HGA supporting bushing 20.

An elongated cylindrical spreader pin 12 has a diameter DS slightly less than diameter 80, and a conical distal tip. Spreader pin 12 extends into the central bore disposed along axis V, extending from spreader pin base 16 (rigidly coupled via bolts to the bottom of housing H). A pneumatic sealing O-ring 22 is disposed between spreader pin base 16 and the sidewall S of housing H. The spreader pin 12 and base 16 correspond, but only in a limited sense, to the spreader pin 212 and base 216 of the prior art structure shown in FIG. 2.

A set of four sealing O-rings 22 is also disposed within the housing 14 of mounting apparatus 10. An uppermost of O-rings 22 is disposed about upper cylindrical shell portion 60 of carrier 18, forming a sliding pneumatic seal between that portion 60 and an inward facing surface of the cylindrical interior of housing 14.

A next lower of the O-rings of set 22 is disposed about central cylindrical shell portion 62 of carrier 18, forming a sliding pneumatic seal between that portion 62 and an inward facing surface of the cylindrical interior of housing 14, and pneumatically isolating an upper region 40 of the cylindrical interior region between carrier 18 and housing 14 and below the uppermost O-ring and the next uppermost O-ring of set 22. The upper region 40 is selectively coupled by way of a pneumatic port 32 to an external source of pressurized air.

A lowermost of the O-rings of set 22 is disposed about cylindrical spreader pin support element 74 of base wall B, forming a sliding pneumatic seal between that element 74 and an inward facing surface of the cylindrical interior of lower cylindrical shell portion 64 of carrier 18, and pneumatically isolating lower region 42 of the cylindrical interior region between carrier 18 and housing 14 and below the lowermost O-ring and the next lowermost O-ring of set 22. The lower region 42 is selectively coupled by way of a pneumatic port 30 to an external source of pressurized air.

Figure 6:
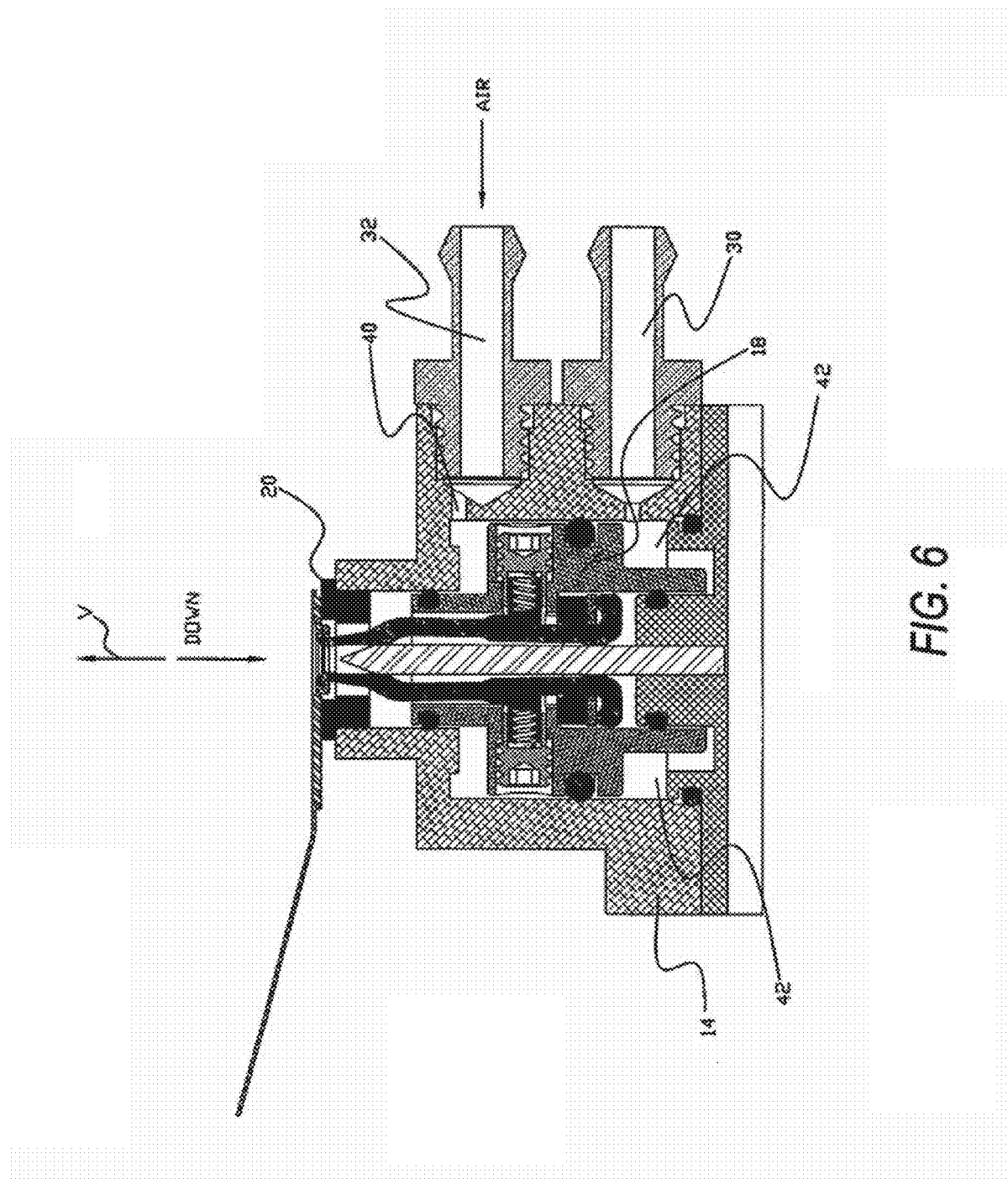
FIG. 6 shows the mounting apparatus of FIG. 4 at a stage of operation with the air piston of the mounting apparatus at its uppermost position along a central, and preferably vertical (as shown), axis.

With the above-described configuration, the carrier 18 is selectively movable within housing 14 along axis V between maximum upper and lower positions in response to an applied air pressure differential applied across ports 30 and 32. For example, with a maximum positive pressure differential (with the pressure in region 42 greater than the pressure in region 40), the carrier 18 is in its maximum upper position as shown in FIG. 5, and with a maximum negative pressure differential (with the pressure in region 40 greater than the pressure in region 42), the carrier 18 is in its maximum lower position as shown in FIG. 6.

Figure 4:
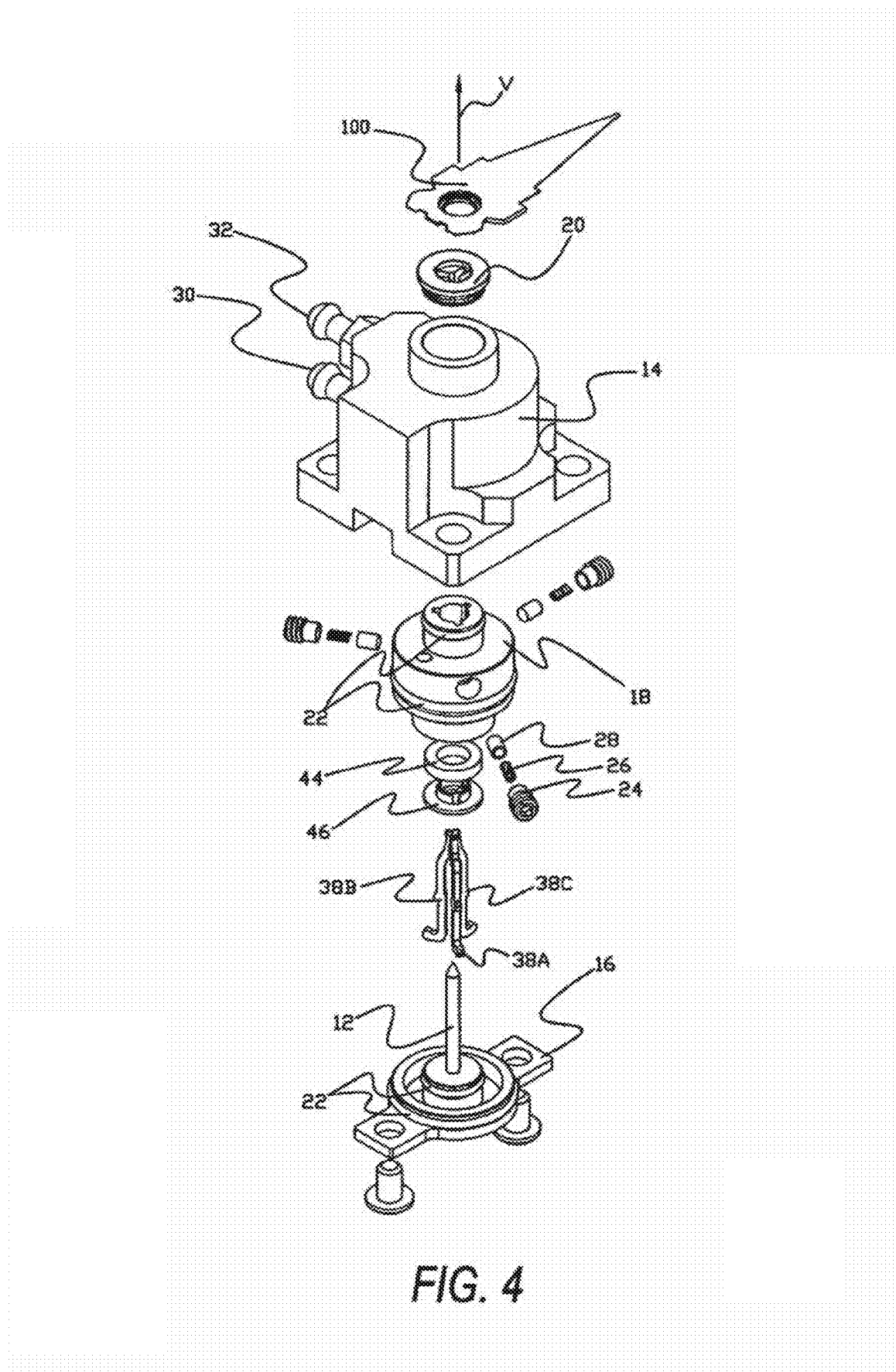
FIG. 4 shows an exploded view of the mounting apparatus of FIG. 3.
Figure 4A:
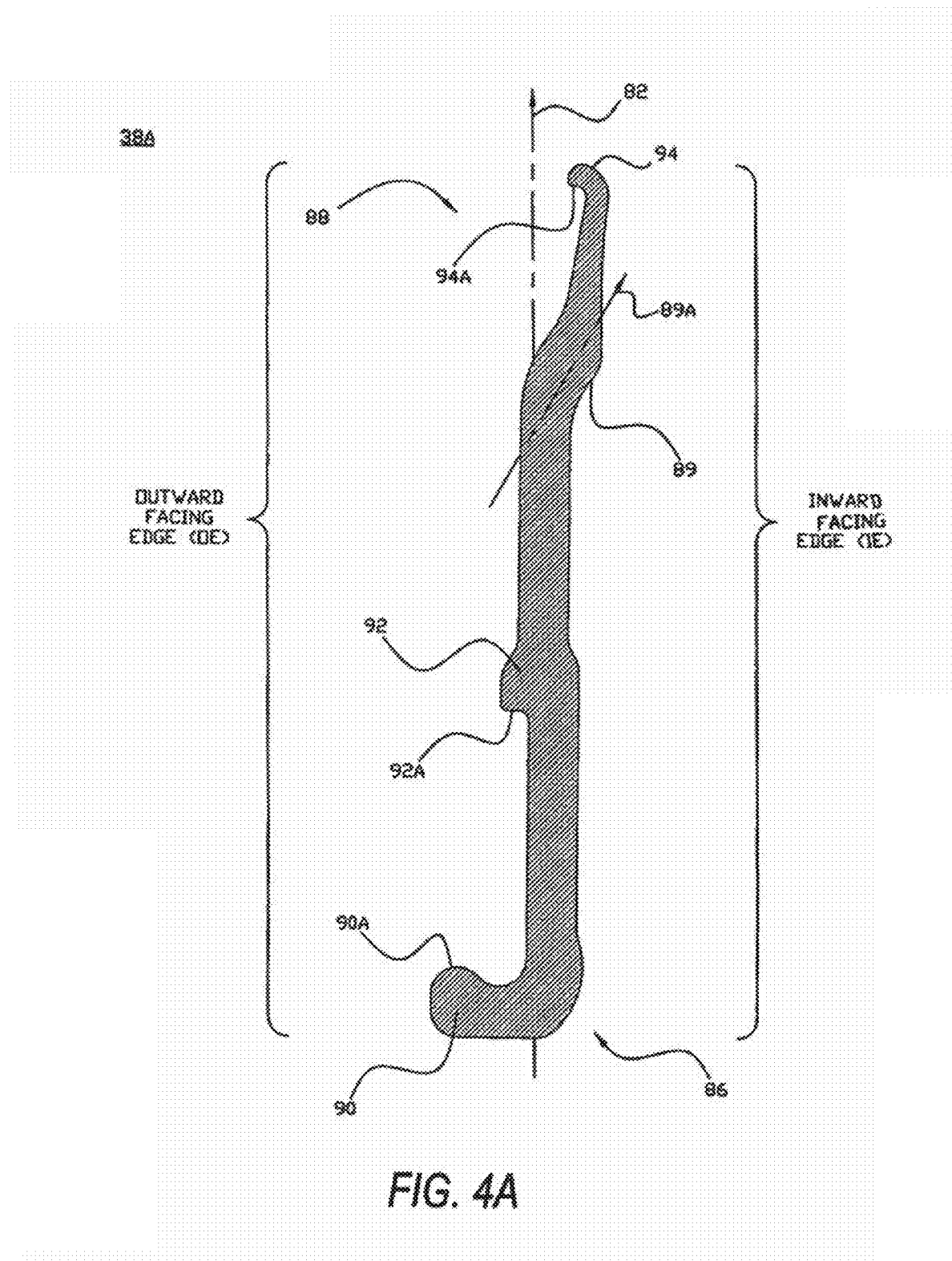
FIG. 4A shows in plan view, an exemplary clamp finger of the mounting apparatus of FIG. 3.

A plan view of an exemplary clamp finger 38A of the mounting apparatus 10 is shown in FIG. 4A. The clamp finger 38A is preferably constructed from a sheet of metal, although other stiff materials can be used. Clamp finger 38A is elongated along a finger axis 82 from a lower end 86 to an upper end 88.

An inward facing edge IE of the finger clamp 38A extends from the lower end 86 to the upper end 88, with a lower portion of the edge IE near lower end 86 extending principally in the direction of the finger axis 82, and with an upper portion of the edge IE near end 88 extending at an angle offset slightly from the direction of the finger axis 82. An intermediate portion of the edge IE between the lower and upper portions near ends 86 and 88 respectively, includes a cam surface 89, where the cam surface 89 extends along a cam axis 89A extending from the lower portion and at an angle greater than the offset angle of the upper portion of edge IE, away from the direction of the finger axis 82.

The outward facing edge OE of the clamp finger 38A includes a lower arm 90 near lower end 86, with an upward facing pusher surface 90A, and an upper arm 92 with downward facing pusher surface 92A. Arms 90 and 92 are mutually spaced apart and extend transverse with respect to the finger axis 82.

At the upper end 88 of clamp finger 38 A, a clamp portion 94 extends from the outward facing edge OE in a direction transverse to finger axis 82, and has a clamp surface 94A facing at least in part, a direction parallel to finger axis 82.

In the illustrated embodiment, mounting apparatus 10, clamp fingers 38A, 38B and 38C are identical. The three clamp fingers 38A, 38B and 38C are disposed within housing 14, with their inward facing edges IE at least in part facing and in contact with a portion of the lateral surface of spreader pin 12. Clamp fingers 38A, 38B and 38C are maintained with a desired angular spacing about the axis V, preferably equi-angular, by radially extending restraining channels extending from the central bore of HGA supporting bushing 20 and stepped cylindrical carrier 18. The channels allow free movement of the clamp fingers 38A, 38B and 38C in the direction of the axis V and the radial direction, while preventing circumferentially-directed movements. The three channels for the respective clamp fingers 38A, 38B and 38C are most clearly visible in FIG. 3A.

In addition, there are three bores in carrier 18, extending radially with respect to axis V, each aligned with a respective one of clamp fingers 38A, 38B and 38C. For each bore, a coil spring 26 resides in the bore, with a spring cap 28 on the innermost end of the spring and facing spreader pin 12. A setscrew 24 is threaded into the outer end of the bore to keep the spring 26 in the bore, with the spring cap end biased against a portion of the outer edge OE of each of clamp fingers 38A, 38B and 38C. Preferably, but not necessarily, the bore, setscrew 24, spring 26, spring cap 28 assemblies are at a point along the axis V so as to apply an inward bias force to the clamp fingers 38A, 38B and 38C between the between upper arm 90 and lower arm 92 of the respective fingers.

An elastic washer 44 and adjacent rigid washer 46 are disposed between the pusher surfaces 90A of lower arms 90 of clamp fingers and an inward extending lip of the carrier 18.

The three clamp fingers 38A, 38B and 38C of mounting apparatus 10 are generally similar in shape to the corresponding clamp fingers 204 of the prior art mounting apparatus structure shown in FIG. 2. However, there are a number of critical distinctions between the disclosed mounting apparatus 10 and that exemplified by the prior art mounting apparatus structure shown in FIG. 2. Those distinctions will now be described in detail.

As noted above, the three clamp fingers 38A, 38B and 38C of mounting apparatus 10 are generally similar in shape to the corresponding clamp fingers 204 of the prior art mounting apparatus structure shown in FIG. 2. Moreover, clamp fingers 38A, 38B and 38C are configured to perform a generally similar overall function as the prior art clamp fingers 204. Namely, both sets of clamp fingers reside in a retracted position with respect to axis V, wholly within the housing and beneath the flat HGA mounting surface (mounting surface 20A in FIGS. 3-6 and mounting surface 224 in FIG. 2) prior to placement of an HGA on the respective mounting apparatus.

Prior to receiving an HGA on the mounting surface for clamping, the carrier is driven upward by an applied air pressure differential, toward the mounting surface, as shown in FIG. 5, so that the distal ends of the clamp fingers extend to their maximum position (with respect to axis V) beyond the mounting surface, but with their uppermost distal ends minimally separated (in response to spring forces applied to the respective fingers by springs 26).

Then, an HGA is placed with its base plate sliding over the distal ends of the fingers so that the base plate rests on the mounting surface with boss hole overlying the aperture in the mounting surface.

To effect clamping, the carrier is then driven downward in response to an applied air pressure differential. As the carrier is driven downward, the cam surfaces of the fingers interferingly interact with first the conical tip and then the cylindrical lateral surface of the spreading pin, driving the distal tips of all fingers radially outward, separating the end portions at the distal tips toward their respective extreme outermost positions overlying the edge of the boss hole of an HGA having its base plate adjacent to the mounting surface of the mounting apparatus of a tester.

Then, still under control of a reversed air pressure differential, the carrier, and the clamp pins carried therein, continue downward until the separated distal tips of the fingers engage portions of the peripheral edge of the boss hole of the base plate of the HGA, clamping the base plate, and thus the HGA to the mounting surface.

While the general functions are similar in some respects, there are principal differences in the mounting apparatus of this disclosure in the detailed structures that directly provide significant improvements in function, operation and costs compared to the prior art.

A principal difference in the mounting apparatus 10 with respect to the prior art, exemplified by the so-called collet assembly of FIG. 2, relates directly to the added structure based on HGA supporting bushing 20, which has no corresponding part, or resultant function, in the collet assembly of FIG. 2. In particular, HGA supporting bushing of the mounting apparatus of the disclosure, provides a central bore through which the distal end of a spreader pin must travel during operation. That bore has a diameter which is slightly greater than that of the pin, establishing a non-yielding (in the radial direction) guide channel for the distal end of the pin. The central bore further provides radially extending channels for passage of the clamp fingers. The central bore through which the distal end of the spreading pin passes, provides control of the otherwise-possible bending of the spreader pin. The bore eliminates-radially-directed bending of the pin and consequent measurement errors present in prior art devices. Moreover, the radial-extending channels allow free movement of the clamp fingers in the direction of the axis V and the radial direction, while preventing circumferentially-directed movements. This aspect further enhances the measurements obtained during testing of heads. Again, there is no corresponding structure in the prior art, exemplified by the so-called collet assembly of FIG. 2.

Another principal difference in the mounting apparatus 10 with respect to the prior art, exemplified by the so-called collet assembly of FIG. 2, relates directly to the pressure devices added to more precisely control the bias forces applied to the clamp fingers against the lateral surface of the spreader pin. The prior art method of generating such bias forces, utilized O-rings and relied on the elastic characteristics of those O-rings and the maintenance of those characteristic in a required range over use and time. In the disclosed mounting apparatus, there are no O-rings to provide bias forces to the clamp fingers. Instead, a radially directed spring force is implemented to provide the bias forces. Those spring forces are significantly more reliable in providing the needed forces over time and require far less maintenance/replacement than O-ring provided forces as used in the prior art.

Another principal difference in the mounting apparatus 10 with respect to the prior art, exemplified by the so-called collet assembly of FIG. 2, relates directly to the clamping forces applied to an HGA by the clamp fingers. In particular, the prior art collet assemblies have a significant limitation that leads to skewing of HGAs clamped to the collet assemblies.

In the prior art, for the collet assembly 200 with its air piston (composed of piston top 208 and retainer 210 and their supported collet fingers 204) in its maximally up position as shown in FIG. 2, as an HGA is placed with its base plate 108 at the mounting area 224, boss hole 110 slips over the extended collet fingers 204. At that time, pressurized air is applied to region 220 to drive the air piston down inside the housing 14. As collet fingers 204 retreat downward into housing 214, the spreader pin 212 forces the distal ends of the collet fingers 204 to spread radially, so that the hooked distal tips overlie the angled surface 110a of the boss hole 110 of HGA base plate 108. With continued downward movement of the air piston, the hooked distal tips engage the angled surface 110a of the boss hole 110, clamping the base plate 108 (and thus HGA 100) to the mounting surface 224 of collet assembly 200.

Unfortunately, in collet assembly 200 and similar prior art mounting apparatuses, the arrangement and configuration of the collet fingers, cause unequal forces to be applied to the angled surface 110a forming the perimeter of the boss hole 110, leading to skewing of the mounted HGA, as described below.

More particularly, the angled surface 110a (extending from the flat bottom of base plate 108) has a conical form, so that the height of a point on the angled surface 110a from the flat bottom, depends on its distance from the center of the boss hole 110. Correspondingly, the height of the point of contact between a tip of any of collet fingers 204 and the angled surface 110a, depends on the position of the HGA base plate 108 relative to the center of the boss hole 110. A small radial displacement of the base plate 108 changes the height of the point of contact by approximately the same amount (depending on the angle of the conical surface 110a).

In common practice, the angled surface 110a of an HGA is formed by a process of stamping. For this reason, the smoothness of the angled surface 110a is not perfect. When the hooked tip of a collet finger hits a ridge of the angled surface 110a, the height is larger. When it hits a depression, the height is smaller. Hence, the irregularities of the angled surface 110a are responsible for a random nature of the height of the point of contact between a tip of a collet finger 204 and the angled surface 110a as well.

The difference in the heights of the points of contact in prior art collet assemblies results in different forces being applied by the respective collet fingers 204 to the angled surface 110a. Different forces applied to the angled surface 110a lead to the base plate 108 skewing. When the axis of skewing is perpendicular to the load beam 104 of the HGA, the skewing affects the angle between the load beam 104 and the surface of a magnetic disk surface being read from or written to, changing the distance between the head 102 and the disk. A decrease of the distance between the head 102 and the disk involves the risk of disk damage. Departure of the head 102 from the disk changes the parameters of read/write process and distorts head (disk) test results. Distortions of the head (disk) test results happens to a greater or lesser extent at other directions of the axis of skewing too.

According to the present disclosure, an elastic washer 44 with an adjacent rigid washer 46 are introduced in the mounting apparatus 10 to prevent finger-to-finger force differences which would lead to skewing of the HGA base plate 108 for an HGA clamped to the mounting surface of the mounting apparatus.

The elastic washer 44 and the adjacent rigid washer 46 are seated on the spread pin 12 and are disposed between the bottom surface of the air piston 18 and the surfaces 90A of lower arms 90 of the clamp fingers 38. The elastic washer 44 equalizes the forces (from finger to finger) that the clamp fingers 38 apply to the angled surface 110a of a clamped HGA, while the rigid washer 46 safeguards the soft elastic material of the washer 44 against incision by the rigid lower ends of the clamp fingers 38.

When pressurized air is fed into the chamber 40 through the port 32, the air piston 18 moves downward, causing the clamp fingers 38 to move in the same direction. Before the clamp fingers 38 contact the angled surface 110a, only forces of friction retard this movement. After one of the clamp fingers 38 reaches the angled surface 110a, it stops, and the force that this finger applies to the elastic washer 44 through the rigid washer 46, increases. When the air piston 18 terminates its movement, the elastic washer 44 is compressed, the extent of compression and the width of the compressed elastic washer 44 being different above crooked bottom ends of different clamp fingers 38. As this has taken place, the top ends of clamp fingers 38 rest on the corresponding points of the angled surface 110a. Since the points of the angled surface 110a have different heights, the clamp fingers 38 are offset in the direction of axis V one relative to another. The different widths of the compressed elastic washer 44 makes possible for the clamp fingers 38 to be at different heights, even though the bottom surface of the air piston 18 is strictly horizontal.

The diameter of the inner aperture of the rigid washer 46 is larger than the diameter of the spread pin 12, so that the rigid washer 46 is able to incline (or tilt) inside the air piston 18. The rigid washer 46 is at the state of equilibrium when the forces applied to it from different clamp fingers 38, are equal. That means that forces applied to the bottom ends of respective clamp fingers 38 are the same. Therefore, the forces, applied by different clamp fingers 38 to the angled surface 110a, are the same too. In this way, the cause of the possible base plate 108 skewing is eliminated.

In general, a mounting apparatus 10 may contain any number of clamp fingers 38 (in U.S. Pat. No. 7,529,635, for example, a collet assembly is described that has four collet fingers). However, the force equalization described in this disclosure, works better when there are three clamp fingers in a mounting apparatus 10. In this case, there is always a plane that goes through the bottom ends of all clamp fingers (three points are needed to determine a position of a plane in space). When rigid washer 46 reaches the state of equilibrium, it lies in this plane. If the number of clamp fingers in the mounting apparatus exceeds three, there may be no plane that contains ends of all of them. In such a case, only an approximate equalization of forces applied to the angled surface 110a, may be reached, and the errors in HGA positioning are not completely eliminated.

Although the foregoing description of the embodiment of the present invention contains some details for purposes of clarity of understanding, the invention is not limited to the detail provided. There are many alternative ways of implementing the invention. The disclosed embodiment is illustrative and not restrictive.

What is claimed is:

1. A mounting apparatus for securing a base plate of a head gimbal assembly (HGA) in a test position on a magnetic head and disk tester, wherein the HGA base plate includes a boss hole, comprising:

A. a housing with a cylindrical cavity extending along a central axis perpendicular from a bottom wall of the housing to a mounting surface at the upper extending transverse to the central axis, wherein the mounting surface includes a central aperture disposed about the central axis, and is adapted for receiving a base plate of an HGA thereon with the boss hole of the HGA overlying the central aperture, B. an air piston carrier movable inside the housing cavity along the central axis, C. a cylindrical spreader pin extending along the central axis from a spreader base affixed to the bottom wall at a proximal end, and through a central bore of the air piston carrier wherein the bore extends along the central axis, and to a conic tip at a distal end, D. a plurality of axially elongated clamp fingers adjoining the spreader pin, wherein the respective clamp fingers are radially dispersed about the central axis, and extend from lower ends close to the housing bottom wall to upper ends far from the housing bottom wall, and include at the lower ends, portions which interferingly engage with complementary portions of the air piston carrier whereby the clamp fingers are coupled to move with the air piston carrier in the direction of the central axis between a loading position with the upper ends disposed through and beyond the mounting surface and a clamping position with the upper ends disposed at or beneath the mounting surface and within the housing, and E. an elastic washer with an adjacent rigid washer, both washers being disposed about the spreader pin and extending transverse thereto, and between a bottom surface of the air piston carrier and radially inward extending arms of the clamp fingers at lower ends of the clamp fingers, whereby the elastic washer and rigid washer in the loading position are adapted to cause upper ends of the clamp fingers to apply equalized clamping forces to portions of an HGA base plate disposed between the upper ends and the mounting surface in response to movement of the air piston carrier in a direction along the central axis and toward the bottom wall of the housing.

2. A mounting apparatus of claim 1 wherein the diameter of the interior aperture of the rigid washer exceeds the diameter of the spreader pin by a predetermined amount, thereby allowing a corresponding skewing of the rigid washer inside the housing cavity.

3. A mounting apparatus of claim 2 farther comprising pressing devices in a number equal to the number of clamp fingers, each pressing device including a set screw, a spring and a spring cap, and residing in a radially extending through-bore of the air piston carrier between the corresponding clamp finger and the housing, said pressing devices configured to apply a spring-based radial inward directed bias force to the corresponding clamp finger, thereby biasing the clamp fingers against a lateral surface of the spreader pin.

4. A mounting apparatus of claim 2, wherein the housing comprises at a top end, a housing base crowned with an HGA supporting bushing, wherein the housing base is manufactured from a lightweight non-hardened metal and the HGA supporting bushing is manufactured from a hardened metal.

5. A mounting apparatus of claim 3, wherein the HGA supporting bushing has radially extending slots, each slot being associated with a corresponding clamp finger and permitting motion of said clamp finger in the directions of the central axis and radially, and restricting motion in a circumferential direction.

6. A mounting apparatus of claim 5 wherein the HGA supporting bushing has a central bore extending along the central axis and has a diameter greater than the diameter of the spreader pin, wherein the central bore of the HGA supporting bushing is configured to restrain radial motion of the top end of the spreader pin distal from the base wall.

7. A mounting apparatus according to claim 1 wherein the central axis is a vertical axis.

8. A mounting apparatus according to claim 4 wherein the hardened metal is stainless steel.

* * * * *